United States Patent [19]

Brunet et al.

[11] Patent Number: 4,808,864
[45] Date of Patent: Feb. 28, 1989

[54] SUPERCONDUCTING ELECTRIC ROTATING MACHINE AND ITS THERMAL INSULATION

[75] Inventors: Yves Brunet, Gieres; Pascal Tixador, Grenoble, both of France

[73] Assignee: Alsthom, Paris, France

[21] Appl. No.: 98,835

[22] Filed: Sep. 21, 1987

[30] Foreign Application Priority Data

Sep. 25, 1986 [FR] France ................. 86 13406

[51] Int. Cl.[4] ............................................. H02K 9/00
[52] U.S. Cl. ..................................... 310/52; 310/261; 310/64; 310/10
[58] Field of Search ............... 310/10, 40, 52, 64, 310/165, 261, 264, 265, 154

[56] References Cited

U.S. PATENT DOCUMENTS

| | | | |
|---|---|---|---|
| 3,015,960 | 1/1962 | Steele | 310/52 |
| 3,665,229 | 5/1972 | Lorch | 310/52 |
| 3,679,920 | 7/1972 | MacNab et al. | 310/52 X |
| 3,745,389 | 7/1973 | Lorch | 310/52 |
| 3,816,780 | 6/1974 | Smith, Jr. et al. | 310/52 |
| 3,891,875 | 6/1975 | Laskaris | 310/52 X |
| 3,942,053 | 3/1976 | Abolins et al. | 310/52 |
| 4,017,755 | 4/1977 | Litz | 310/52 X |
| 4,058,746 | 11/1977 | Mole et al. | 310/52 X |
| 4,117,357 | 9/1978 | Baumann | 310/52 |
| 4,174,483 | 11/1979 | Vinokurov et al. | 310/52 |
| 4,291,997 | 9/1981 | Laskaris | 310/52 |
| 4,352,033 | 9/1982 | Antonov et al. | 310/52 |

FOREIGN PATENT DOCUMENTS

| | | |
|---|---|---|
| 2235518 | 1/1975 | France . |
| 2372535 | 6/1978 | France . |
| 1050521 | 12/1966 | United Kingdom . |
| 1282412 | 7/1972 | United Kingdom . |

*Primary Examiner*—Mark O. Budd
*Attorney, Agent, or Firm*—Sughrue, Mion, Zinn, Macpeak, and Seas

[57] ABSTRACT

The electric rotating machine has a stator and a rotor with superconducting windings placed within separate cryogenic enclosures for the stator and the rotor. The cryogenic enclosures are in turn placed within evacuated thermal insulation enclosures separated by the annular clearance space which is at low pressure, thus considerably simplifying the arrangements required for dynamic sealing of motor bearings.

2 Claims, 3 Drawing Sheets

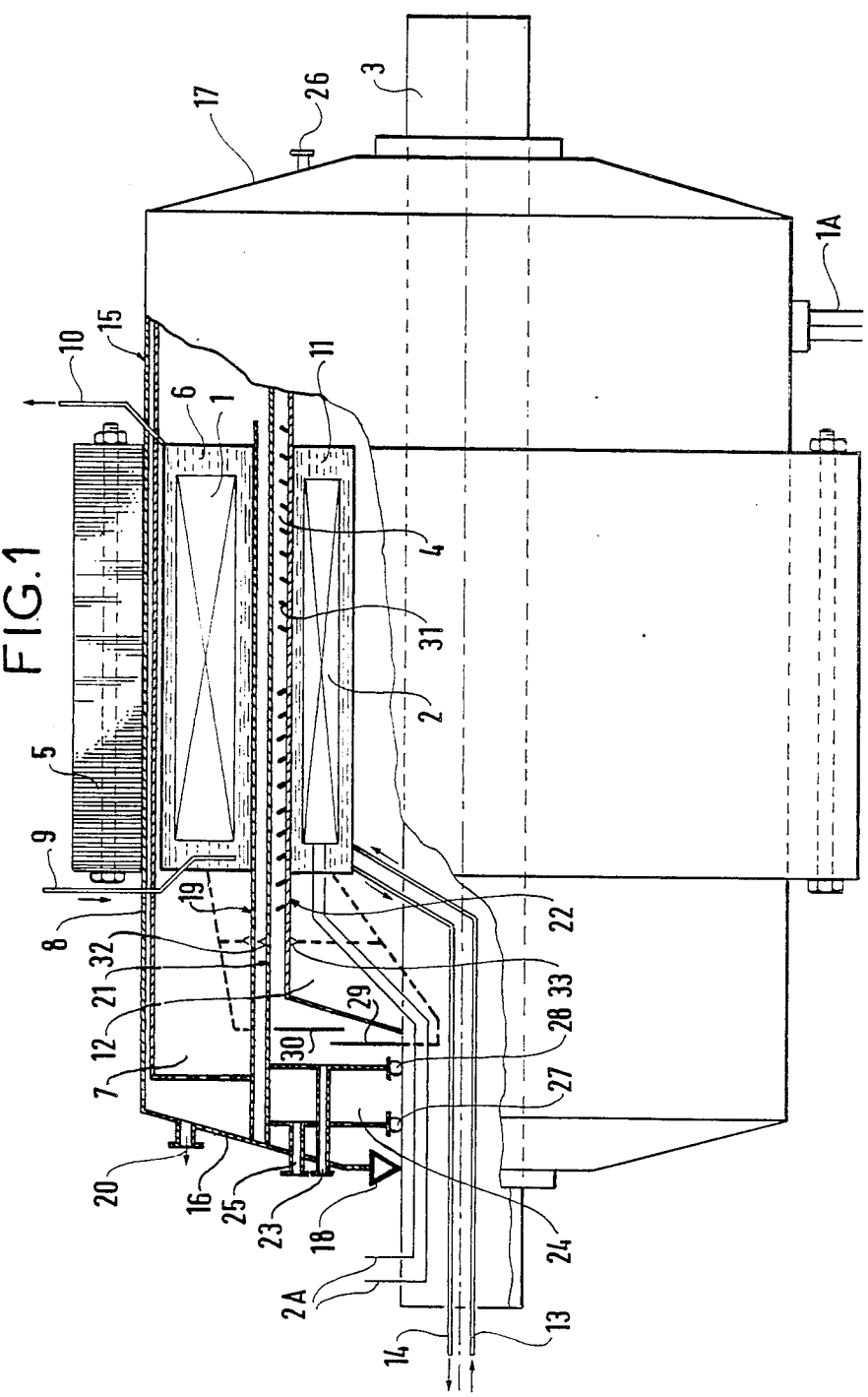

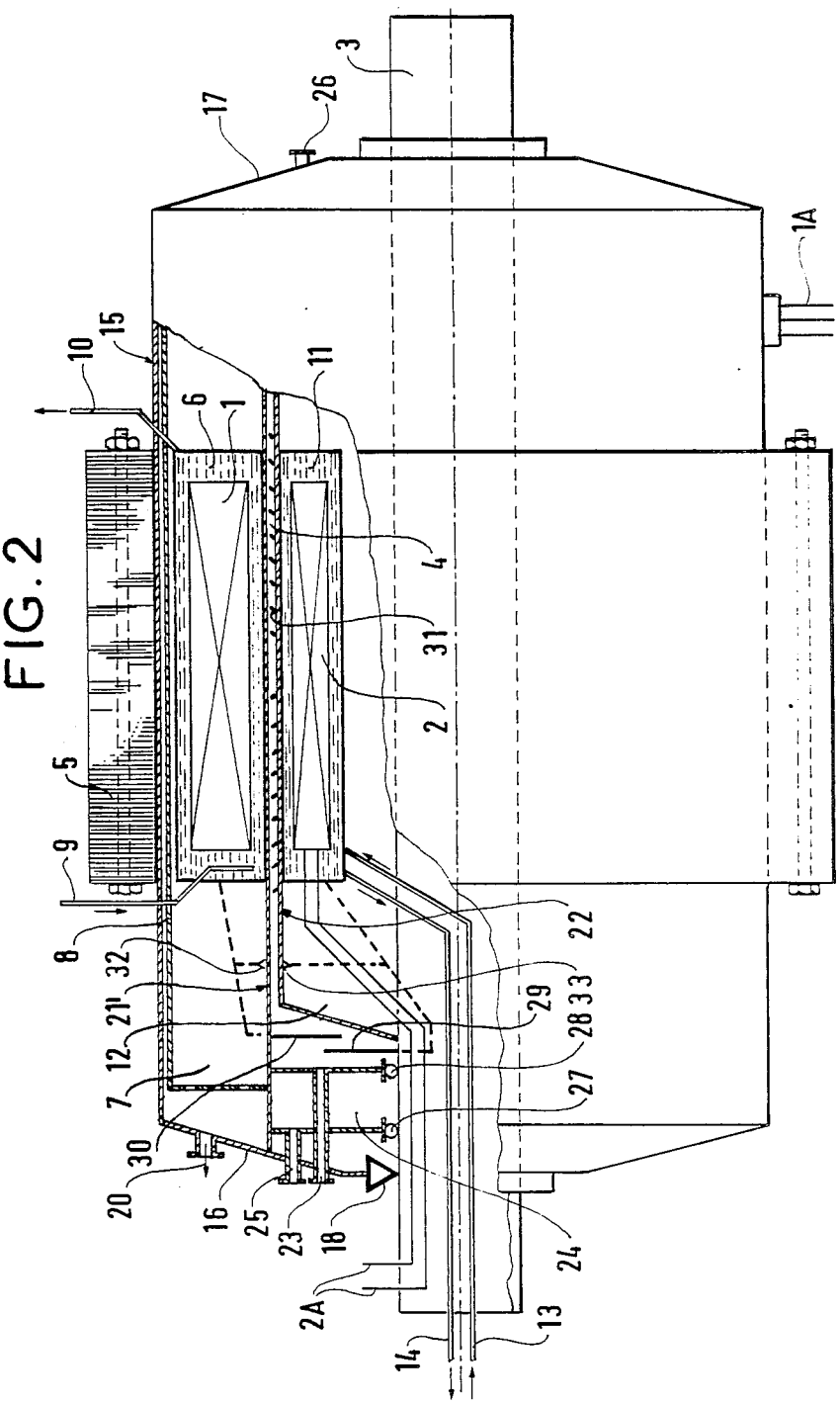

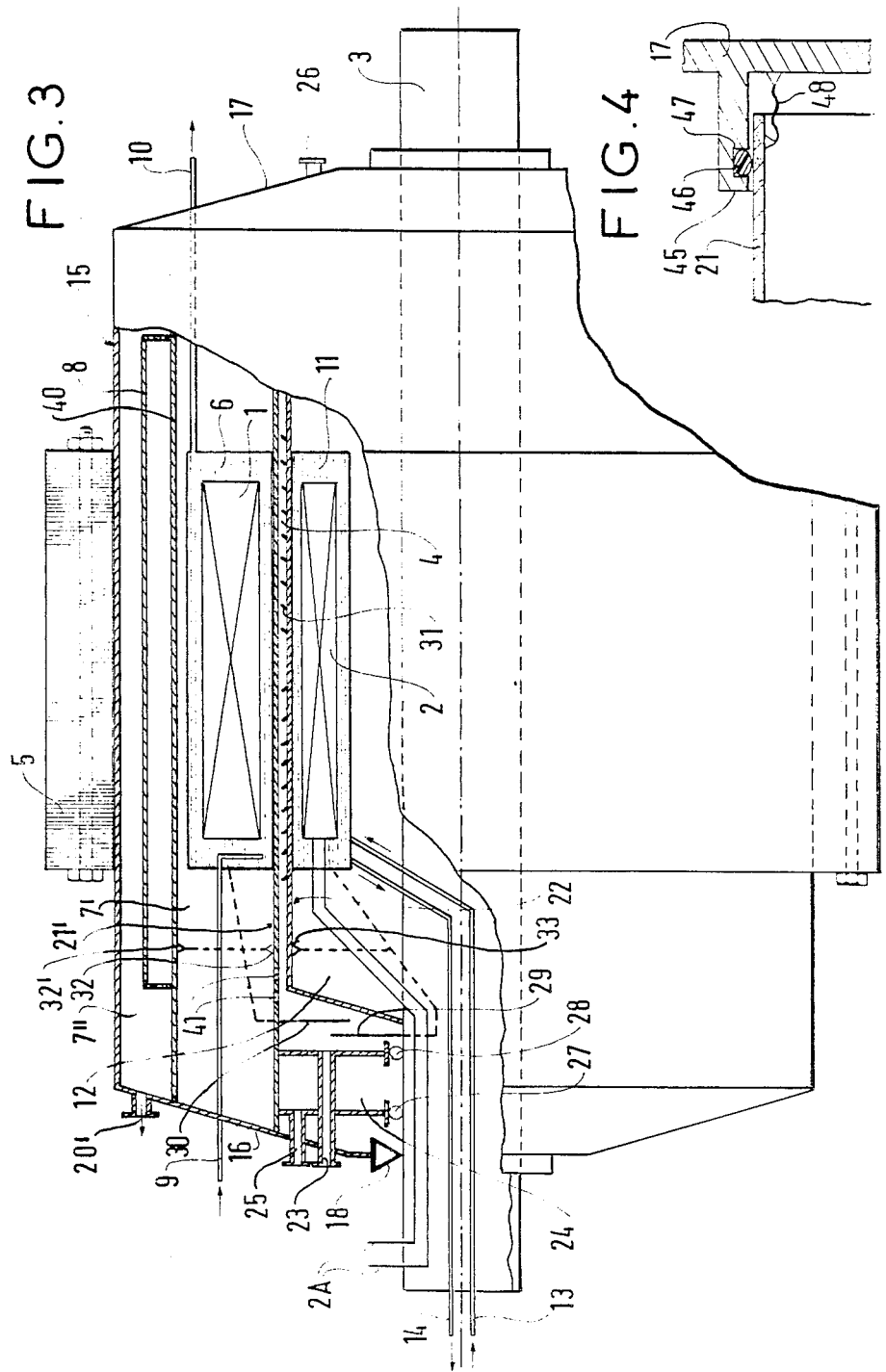

SUPERCONDUCTING ELECTRIC ROTATING MACHINE AND ITS THERMAL INSULATION

BACKGROUND OF THE INVENTION

1. Field of the Invention

The present invention relates to electric rotating machines of the type provided with a superconducting stator and rotor.

2. Description of the Prior Art

In this type of machine, the stator and rotor windings are placed within heat-insulated cryogenic enclosures which are separated from each other by an evacuated annular clearance space between stator and rotor in order to reduce introductions of heat to a minimum.

The maintenance of a high vacuum within the annular clearance space calls for the use of rotary seals which achieve a high standard of leak-tightness but involve considerable difficulties in actual practice.

In order to circumvent these difficulties, a known solution proposed in U.S. Pat. No. 4,239,999 consists in completing the rotary seals placed in the vicinity of the rotor bearings by a vacuum pump system formed by two concentric sets of cylindrical sleeves provided with orifices, these sleeves being fitted one inside the other and rigidly fixed in one case to the stationary portion and in the other case to the rotating portion of the motor. This arrangement permits a reduction in standards of leak-tightness imposed on the performances of rotary seals by placing these latter on the downstream side of a pump which produces a very high vacuum. However, this is achieved at the cost of a considerable increase in complexity of the structure of the machine in the vicinity of its bearings.

SUMMARY OF THE INVENTION

The present invention is intended to overcome the difficulty mentioned in the foregoing by maintaining a simple structure for the rotating machine.

The electric rotating machine in accordance with the invention has a stator and a rotor with superconducting windings placed within separate cryogenic enclosures for the rotor and the stator, said enclosures being in turn placed within thermal insulation enclosures separated by a low-pressure annular clearance space, thus considerably simplifying the dynamic sealing problems encountered heretofore.

The thermal insulation enclosure which contains the cryogenic stator enclosure is separated from the annular clearance space by a tubular partition attached at the ends thereof to two stator end-shields of the machine by means which allow axial expansion such as a piston seal. Said tubular partition can be leak-tight whilst the thermal insulation enclosure of the stator is either fully evacuated or else non-leaktight in which case the thermal insulation enclosure of the stator is provided with an inner chamber which contains the cryogenic enclosure and is filled with material in the form of powder, fibers or foam so as to reduce the axial thermal conductivity, said thermal insulation enclosure being also provided with an evacuated outer chamber.

The annular clearance space can be delimited on the rotor side by a drum which supports a double Archimedean screw. When the rotor is in motion, the gases which fill the annular clearance space tend to be driven back by said screw towards the ends of the machine and then discharged from the space located between the cryogenic stator and rotor enclosures, thus limiting introductions of heat. Said annular clearance space is advantageously filled with helium vapors at a pressure of 1 to 10 Pascals.

BRIEF DESCRIPTION OF THE DRAWINGS

FIGS. 1, 2 and 3 are fragmentary longitudinal part-sectional views of machines in accordance with the invention.

FIG. 4 is a fragmentary longitudinal sectional view of a structural element of the machines illustrated in the preceding figures.

DESCRIPTION OF THE PREFERRED EMBODIMENTS

The machine shown in FIG. 1 has three-phase stator windings 1 of superconducting material and rotor windings 2 which are also of superconducting material. Three-phase conductors 1A extend from the stator to a supply or to an external load, depending on whether the machine considered is employed as a motor or as an alternator. The rotor is carried by a rotating shaft 3. The rotor windings are connected to an external supply by means of conductors 2A. The periphery of the rotor is separated from the stator by an air-gap or so-called annular clearance space 4. Around the stator is placed a magnetic ring 5 of iron laminations for preventing the magnetic flux from passing out of the machine.

The stator windings are arranged within a cryogenic enclosure 6 filled with helium at 4.2K, said enclosure being in turn surrounded by an evacuated thermal insulation enclosure 7 in which is placed an anti-radiation thermal screen 8 formed for example of reflecting sheets separated by insulating webs. The liquid helium is introduced into the cryogenic stator enclosure 6 through a pipe 9 and the helium vapor thus formed is discharged through a pipe 10.

The rotor windings are arranged within a cryogenic enclosure 11 which is in turn surrounded by an evacuated thermal insulation enclosure 12. The helium flows within the cryogenic rotor enclosure 11 in the liquid state and above its critical pressure, for example at $3 \times 10^4$ Pascals at 4.7K. Said liquid helium is introduced through a pipe 13, then discharged after heating through a pipe 14 which passes within the rotating shaft 3 and passes out of the machine via a rotary coupling of the Johnston type, for example.

The stator and rotor elements of the machine are all contained within a casing 15 provided with end-shields 16, 17 on which are fixed bearings 18 for supporting the rotor shaft 3.

The cryogenic stator enclosure 6 is attached on one side to one of the end-shields 16 by means of a support tube 19 of material having low thermal conductivity and on the other side to the periphery of the casing by means of a system of small columns (not shown in the drawings) for damping vibrations.

The evacuated thermal insulation enclosure 7 of the cryogenic stator enclosure 6 is connected by means of a pipe 20 to an external vacuum source and is separated from the annular clearance space 4 (air-gap) by a very thin leak-tight tube 21 which is dimensioned solely with a view to withstanding the pressure of the annular clearance space 4 and the ends of which are secured to the end-shields 16, 17 in leak-tight manner by means for allowing axial expansion such as the piston seal which will hereinafter be described with reference to FIG. 4.

The cryogenic rotor enclosure 11 is fixed within a drum 22 which delimits the sealed evacuated thermal insulation enclosure 12.

The annular clearance space 4 is delimited on the stator side by the leak-tight tube 21 and on the rotor side by the rotary drum 22. Said annular clearance space is connected to a vacuum pump by means of a pipe 23 and can thus be maintained at a low pressure of the order of 1 to 10 Pascals.

At each end of the rotor shaft 3, the aforementioned annular clearance space 4 is separated from the surrounding atmosphere by an intermediate annular chamber 24 which is filled with helium gas at a pressure of slightly higher value than atmospheric pressure by means of a feed pipe 25, 26. Said annular chamber 24 is made leak-tight at the level of the rotor shaft 3 by means of two successive rotary seals 27, 28.

The rotary seal 28 which separates the annular clearance space 4 from one intermediate chamber 24 is an oil seal designed to withstand a low vacuum followed by oil-vapor cold traps 29, 30 which are supplied by the stator and rotor cryogenic enclosures 6, 11.

Filling of the annular clearance space 4 with helium gas prevents any condensation on that part of the drum 22 which is in contact with the cryogenic rotor enclosure 11. At this level, additions of heat produced by frictional losses arising from the presence of helium vapor within the annular clearance space 4 are reduced in two ways, namely on the one hand by means of a thread 31 embossed on the rotary drum 22 in a double Archimedean screw pattern which tends to entrain the helium gas towards the ends of the annular clearance space 4 and, on the other hand, by means of cold spots 32, 33 placed on each side of the cryogenic stator and rotor enclosures 6 and 11 on the exterior of the tube 21 and within the interior of the rotary drum 22.

FIG. 2 illustrates an alternative embodiment of the machine shown in FIG. 1 and differs from this latter in regard to the mode of attachment of the cryogenic stator enclosure 6. In FIG. 2, elements which remain unmodified have retained the same references as in FIG. 1.

The modification consists in supporting the cryogenic stator enclosure 6 directly on the leak-tight tube 21' which delimits the annular clearance space 4 on the stator side. This makes it possible to eliminate the special support tube which had previously served to secure one side of the stator enclosure 6 to one end-shield 16 of the machine as well as to dispense with the system of small columns which had served to secure the other side of the cryogenic stator enclosure 6 to the periphery of the casing 15 of the machine. Elimination of these parts has the effect of reducing introductions of heat from the exterior into the cryogenic stator enclosure 6 but entails the disadvantage, however, of affording a lower degree of protection against thermal additions by gaseous conduction within the annular clearance space 4 and of involving the need to reinforce the leak-tight tube 21.

FIG. 3 illustrates another alternative embodiment of the machine shown in FIG. 1. This form of construction differs from the first in regard to the configuration of the thermal insulation enclosure of the cryogenic stator enclosure and in regard to the mode of attachment of this latter. As in the previous embodiment, the unmodified elements retain the same references as those of FIG. 1.

In this alternative embodiment, the thermal insulation enclosure of the cryogenic stator enclosure 6 is divided into two concentric annular chambers 7' and 7" by means of a leak-tight tubular partition 40 which is attached at the ends thereof to the two end-shields 16 and 17 of the casing 15 of the machine. As in the preceding alternative embodiment, the cryogenic stator enclosure 6 is supported by the tube 21" which delimits the annular clearance space 4 on the stator side.

The inner concentric chamber 7' which contains the cryogenic stator enclosure 6 communicates with the annular clearance space 4 through orifices 41 pierced through the wall of the separating tube 21" in the vicinity of the tube ends and is filled with heat-insulating material consisting of powder, fibers or foam, which inhibits additions of heat by axial conduction through the low-pressure helium vapors.

The outer concentric chamber 7" is a vacuum enclosure which contains the anti-radiation thermal screen 8 and which prevents any thermal additions from the exterior of the machine. This chamber is connected to a vacuum pump by means of a pipe 20'. The structure of said chamber is simplified by virtue of the fact that this latter is not traversed by electric conductors or helium ducts since it is located outside the cryogenic enclosure of the stator.

Cold spots 32 and 32' supplied by the cryogenic stator enclosure 4 and placed on each side of this latter within the inner concentric chamber 7', against the tubular partition 40 and the separating tube 21", recover the enthalpy of the low-pressure helium vapor released from the cryogenic stator enclosure 6 by means of a system which is not illustrated in the figure.

In the machines which have just been described, the ends of the tubes 21, 21', 21" which delimit the annular clearance space 4 as well as the tubular partition 40 are attached for example to an end-shield 17 of the casing 15 so as to admit of axial expansion by making use for example of a piston seal as shown in FIG. 4 in the case of the tube 21.

As is visible in FIG. 4, one of the end-shields 17 of the machine casing is provided internally with a circular ridge 45 in which the end of the tube 21 is adapted to engage with a small clearance. An annular seal 46 fitted within a lateral groove 47 at the end of the circular ridge 45 obstructs the clearance between the ridge and the end of the tube when it is necessary to provide a tight seal as in the case of the tubes 21 and 21' as well as the tubular partition 40 whilst flexible braided-wire elements 48 of good heat-conducting material connect the end-shield 17 to the end of the tube 21 in order to ensure equalization of temperatures and to maintain the seal 46 at a temperature which is of sufficient value to ensure that said seal remains fully effective under service conditions.

What is claimed is:

1. An electric rotating machine having a stator and a rotor with superconducting windings placed within separate cryogenic enclosures, wherein the cryogenic enclosures of the stator and of the rotor are placed within evacuated thermal insulation enclosures separated by a low-pressure annular clearance space, wherein the wall providing a separation between the evacuated thermal insulation enclosure of the stator and the annular clearance space is a tube attached at the ends thereof to two end-shields of the machine by attachment means which admit of axial expansion, and wherein said attachment means is comprised of annular ridges on said tube end shields surrounding opposite ends of said tube respectively, sealing rings disposed between said ridges and the opposite ends of said tube and flexible braided wire elements of a material having good thermal conductivity connected between said end shields and said ends of said tube.

2. An electric rotating machine having a stator and a rotor with superconducting windings placed within separate cryogenic enclosures, wherein the cryogenic enclosures of the stator and of the rotor are placed within evacuated thermal insulation enclosures separated by the low-pressure annular clearance space, and wherein the evacuated thermal insulation enclosure of the rotor is delimited on the same side as the annular clearance space by a drum provided with a thread embossed in an Archimedean screw pattern so that the gas which is present within the annular clearance space is entrained towards the ends of said space.

* * * * *